United States Patent
Evans

(10) Patent No.: US 9,206,706 B2
(45) Date of Patent: Dec. 8, 2015

(54) TURBOMACHINE CASING ASSEMBLY

(71) Applicant: ROLLS-ROYCE PLC, London (GB)

(72) Inventor: Dale Edward Evans, Derby (GB)

(73) Assignee: ROLLS-ROYCE plc, London (GB)

( * ) Notice: Subject to any disclaimer, the term of this patent is extended or adjusted under 35 U.S.C. 154(b) by 682 days.

(21) Appl. No.: 13/741,728

(22) Filed: Jan. 15, 2013

(65) Prior Publication Data

US 2014/0072426 A1    Mar. 13, 2014

(30) Foreign Application Priority Data

Jan. 25, 2012  (GB) .................................. 1201180.5

(51) Int. Cl.
*F01D 25/24* (2006.01)
*F01D 21/04* (2006.01)
*F02K 3/06* (2006.01)

(52) U.S. Cl.
CPC .............. *F01D 25/24* (2013.01); *F01D 21/045* (2013.01); *F01D 25/243* (2013.01); *F02K 3/06* (2013.01); *F05D 2250/283* (2013.01); *Y02T 50/672* (2013.01)

(58) Field of Classification Search
CPC ..... F01D 21/045; F01D 25/243; F01D 25/24; F05D 2250/283; F02K 3/06
See application file for complete search history.

(56) References Cited

U.S. PATENT DOCUMENTS

| | | | |
|---|---|---|---|
| 5,431,532 A | 7/1995 | Humke et al. | |
| 6,206,631 B1 * | 3/2001 | Schilling | 415/9 |
| 6,575,694 B1 * | 6/2003 | Thompson et al. | 415/9 |
| 2004/0126553 A1 * | 7/2004 | Adzima et al. | 428/292.1 |
| 2008/0075587 A1 | 3/2008 | Lenk et al. | |
| 2009/0256296 A1 * | 10/2009 | Aulich et al. | 267/148 |
| 2010/0028130 A1 * | 2/2010 | Reed | 415/9 |
| 2011/0076132 A1 * | 3/2011 | Bottome | 415/9 |
| 2012/0224958 A1 * | 9/2012 | Reed et al. | 415/213.1 |

FOREIGN PATENT DOCUMENTS

| | | |
|---|---|---|
| EP | 1 083 300 A2 | 3/2001 |
| EP | 2 305 985 | 4/2011 |
| EP | 2 305 985 A2 | 4/2011 |

OTHER PUBLICATIONS

May 3, 2013 European Search Report issued in European Patent Application No. EP 13 15 1240.
British Search Report issued in British Patent Application No. GB1201180.5 on May 24, 2012.

* cited by examiner

*Primary Examiner* — Igor Kershteyn
*Assistant Examiner* — Woody A Lee, Jr.
(74) *Attorney, Agent, or Firm* — Oliff PLC

(57) ABSTRACT

A turbomachine casing assembly includes a first casing element locatable radially outward of one or more rotating aerofoil elements of a turbomachine, a second casing element located radially distal to the first casing element. A void is provided between a radially proximal face of the first casing element and a radially proximal face of the second casing element, at the first end of the first casing element. The first end of the first casing element is located against a corresponding first end of the second casing element by an energy absorbing element, with the first casing element; including a cantilever. The cantilever is arranged in a region extending along the first casing element from the first end; and having a pivot axis at a mid portion thereof.

8 Claims, 11 Drawing Sheets

TURBOMACHINE CASING ASSEMBLY

This invention claims the benefit of UK Patent Application No. 1201180.5, filed on 25 Jan. 2012, which is hereby incorporated herein in its entirety.

FIELD OF THE INVENTION

This invention relates to a turbomachine casing assembly and particularly, but not exclusively, to a casing assembly for the fan of a turbofan gas turbine engine.

BACKGROUND

Turbofan gas turbine engines for powering aircraft generally comprise inter alia a core engine, which drives a fan. The fan comprises a number of radially extending fan blades mounted on a fan rotor which is enclosed by a generally cylindrical fan casing.

To satisfy regulatory requirements, such engines are required to demonstrate that if part or all of a fan blade were to become detached from the remainder of the fan, that the detached parts are suitably captured within the engine containment system.

It is known to provide the fan casing with a fan track liner which together incorporate a containment system, designed to contain any released blades or associated debris. FIG. 1 shows a partial cross-section of such a casing and fan track liner.

In the event of a "fan blade off" (FBO) event, the detached fan blade 8 travels radially outward and forwards. In doing so, it penetrates the attrition liner 10. It may also penetrate the septum 12 and aluminium honeycomb layer 14 before engaging the hook 18. The fan track liner must therefore be relatively weak in order that any released blade or fragment thereof can pass through it essentially unimpeded and subsequently be trapped by the fan casing.

In addition to providing a blade containment system, the fan track liner includes an annular layer of abradable material which surrounds the fan blades. During operation of the engine, the fan blades rotate freely within the fan track liner. At their maximum extension of movement and/or creep, or during an extreme event, the blades may cut a path into this abradable layer creating a seal against the fan casing and minimising air leakage around the blade tips.

The fan track liner must also be resistant to ice impact loads. A rearward portion of the fan track liner is conventionally provided with an annular ice impact panel. This is typically a glass-reinforced plastic (GRP) moulding which may also be wrapped with GRP to increase its impact strength. Ice which forms on the fan blades is acted on by both centrifugal and airflow forces, which respectively cause it to move outwards and rearwards before being shed from the blades.

The geometry of a conventional fan blade is such that the ice is shed from the trailing edge of the blade, strikes the ice impact panel and is deflected without damaging the panel.

Swept fan blades are increasingly used in turbofan engines as they offer significant advantages in efficiency over conventional fan blades. Swept fan blades have a greater chord length at their central portion than conventional fan blades. This greater chordal length means that ice that forms on a swept fan blade follows the same rearward and outward path as on a conventional fan blade but may reach the radially outer tip of the blade before it reaches the trailing edge. It will therefore be shed from the blade tip and may strike the fan track liner forward of the ice impact panel within the blade off zone.

The liner used with a swept fan blade is therefore required to be strong enough to resist ice impact whilst allowing a detached fan blade to penetrate and be contained therewithin.

In recent years there has been a trend towards the use of lighter fan blades, which are typically either of hollow metal or of composite construction. These lighter blades have a similar impact energy per unit area as an ice sheet, which makes it more difficult to devise a casing arrangement that will resist the passage of ice and yet not interfere with the trajectory of a released fan blade.

It is an objective of this invention to provide a gas turbine engine containment assembly that will substantially overcome the problems described above, and that is particularly suited for use with composite, hollow metallic, or other lightweight, fan blades.

STATEMENTS OF INVENTION

According to a first aspect of the present invention there is provided a turbomachine casing assembly, comprising:
  a first casing element locatable radially outward of one or more rotating aerofoil elements of a turbomachine;
  a second casing element located radially outward of the first casing element; and
  a void, provided between the first casing element and the second casing element, at a first end of the first casing element;
  wherein the first end of the first casing element is located against a corresponding first end of the second casing element by a plurality of resilient leaf elements, and
  the first casing element comprises a cantilever, the cantilever being arranged in a region extending along the first casing element from the first end and having a pivot axis at a mid portion of the first casing element;
  whereby upon release of one of the rotating aerofoil elements, the cantilever bends into the void provided between the first and second casing elements, which causes the resilient leaf elements to deform and to thereby absorb at least some of the impact energy resulting from the released rotating aerofoil element.

The casing assembly of the present invention allows a shed fan blade to penetrate the first casing element at a first, or forward, end, whilst remaining rigid to ice impact at the opposite, or rear, end. The competing requirements of fan blade ice shedding loads and fan blade off loads may thus be accommodated in a way that was not previously possible. The manner in which this is done allows for the potential to tune the casing assembly to correctly service each requirement and does so whilst saving weight and easing manufacture.

In addition, by forming a void within the casing assembly, the weight of the assembly can be reduced. This increases the efficiency of the engine and thus makes it more attractive for aircraft applications.

The use of a plurality of leaf elements provides a simple and effective means of providing an energy absorbing element which occupies a minimum volume of space.

Optionally, each leaf element is formed from a material selected from the group comprising thermoplastic, carbon fibre and glass fibre materials and composites thereof.

Optionally, the first casing element comprises an infill element disposed between the proximal and distal faces thereof, and wherein the plurality of leaf elements are each bonded to a first end of the infill element.

Optionally, an end of each of the plurality of leaf elements is bonded to a binder block, the binder block being attached to the first end of the infill element.

The use of a binder block to accommodate an end of each of the leaf elements makes the assembly of the first casing element easier and more convenient.

Optionally, each of the plurality of leaf elements is attached to one another.

Optionally, each of the plurality of leaf elements is attached to one another by through stitching.

In one embodiment of the present invention the plurality of leaf elements are through stitched to one another. In other arrangements, the leaf elements may be adhesively bonded to one another.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of preferred embodiments of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 2:
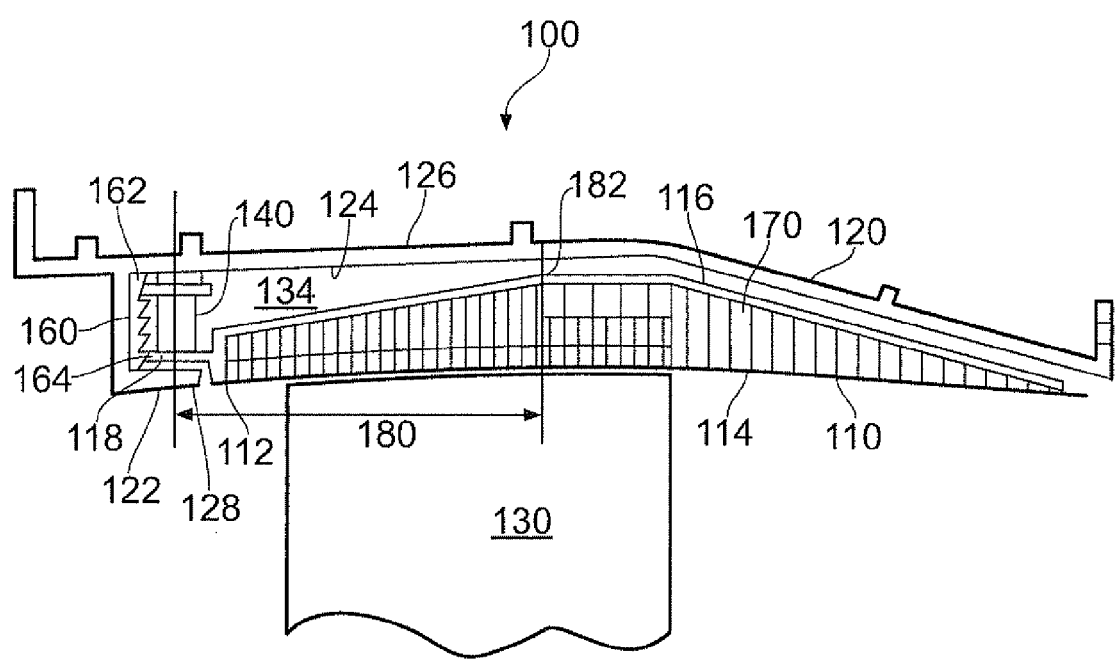
FIG. 2 shows a partial, sectional view of a fan casing assembly, not forming part of the present invention.

Referring to FIG. 2, a fan casing assembly, not forming part of the present invention, is designated generally by the reference numeral 100 and comprises a first casing element 110 and a second casing element 120.

The first casing element 110 has a first end 112, a radially proximal surface 114 and a radially distal surface 116, and the second casing element 120 has a first end 122, a radially proximal surface 124 and a radially distal surface 126.

The first casing element 110 at least partially encloses one or more rotating aerofoil structures 130. These aerofoil structures 130 may comprise blades of a turbomachine, in particular compressor fan blades. The second casing element 120 is disposed radially distal to the first casing element 110.

The turbomachine casing assembly 100 comprises a plurality of first casing elements 110 circumferentially disposed about a curve defined by the blade tip path of the one or more aerofoil structures 130 of the turbomachine. The first and/or second casing elements 110,120 may typically be metallic and may, for example, be formed of aluminium, titanium, steel or any other suitable metal. The first and/or second casing elements 110,120 may typically be formed from fibre reinforced composite materials which may include some integral metallic features.

The first end 112 of the first casing element 110 is aligned with the first end 122 of the second casing element 120 and is maintained in its radial position relative to the fan blades 130 by an energy absorbing element in the form of a crushable collar 140.

Figure 3:
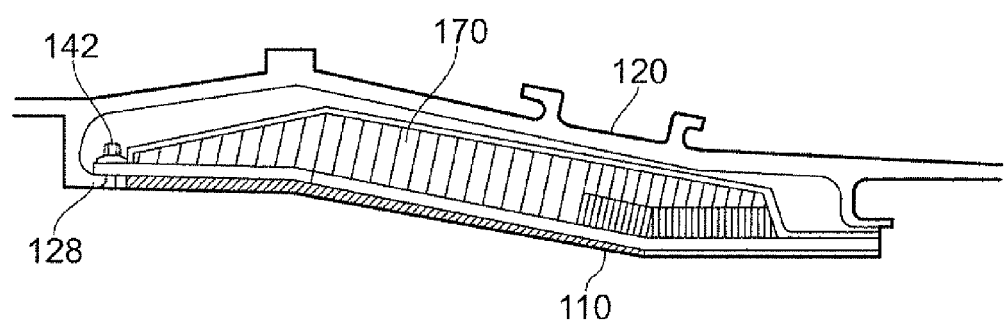
FIG. 3 shows a partial, sectional view of a fan casing assembly, not forming part of the present invention.
Figure 4A:
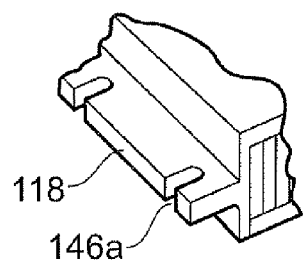
FIGS. 4a and 4b show details of alternative fastening arrangements for the fan casing assembly of FIG. 3.
Figure 4B:
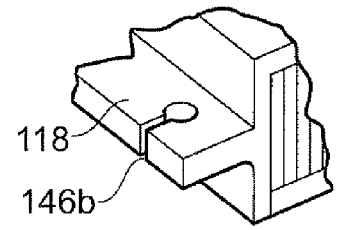
Figure 5:
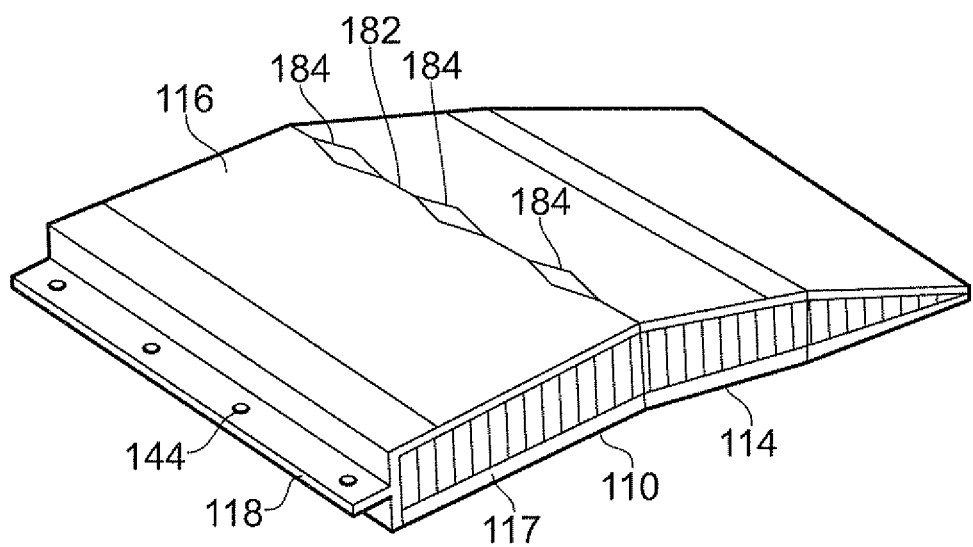
FIG. 5 shows a perspective view of a fan track liner, not forming part of the present invention.

In an alternative arrangement, the energy absorbing element takes the form of a fusible or stretchable fastener 142, such as a bolt, as shown in FIG. 3. The stretchable bolt 142 connects the first end 112 of the first casing element 110 to the first end 122 of the second casing element 120. As shown in FIG. 5, these fasteners 142 extend through holes 144 in a forward rail 118 extending across the width of the first end 112 of the first casing element 110. As a further alternative, these holes 144 further comprise slots 146a, 146b, as shown in FIGS. 4a and 4b. The use of slotted holes allows the first end 112 of the first casing element 110 to hinge and move axially whilst the fasteners 142 stretch to failure.

A ratchet retention mechanism 160 is provided at the juncture of the first ends 112,122 of the first and second casing elements 110,120. This mechanism 160 takes the form of a linear rack 162 which is disposed at the first end 122 of the second casing element 120 and a pawl 164 disposed on the first end 112 of the first casing element 110. The pawl 164 engages with the rack 162 such that the first casing element 110 is able to move radially outwards but is not able to return to its original position.

The casing assembly 100 comprises an infill member 170, in the form of a structural liner positioned between the proximal 114,116 and distal surfaces of the first casing element 110. The infill member 170 may be formed from a frangible or crushable structure, such as acoustic foam or honeycomb material.

The honeycomb material may be formed from a metal, such as aluminium, or from a non-metallic material, such as Nomex™ (a flame resistant aramid material).

In an alternative embodiment of the invention, the infill member 170 may be formed as a separate, discrete layer positioned between the first and second casing elements 110, 120.

Each first casing element 110 includes, on its radially proximal surface 114, an abradable layer 117 (see FIG. 5). The abradable layer 117 is attached to the infill member 170. An exemplary material for the abradable layer 117 is an epoxy resin or a polysulphide sealant, which may be curable at room temperature. The abradable layer 117 provides a surface against which the fan blade 130 is able to rub and cut a path for itself. For example, the fan blades 130 may rub against the abradable layer 117 and form a seal during normal engine operation.

Optionally, a septum layer (not shown) may be provided as an interlayer between the abradable layer 117 and the infill member 170. The septum layer may be metallic or may be formed from a carbon fibre and/or glass fibre reinforced composite material.

As shown in FIG. 2, the forward portion of the distal face 116 of the first casing element 110 is angled relative to the corresponding proximal face 124 of the second casing element 120 such that a void 134 is defined between the first and second casing elements 110,120 at their forward, or first, ends 112,122.

The relative angled arrangement between the forward portions of the first and second casing elements 110,120 results in the forward portion of the first casing element 110 forming a cantilever structure 180. The cantilever 180 is arranged in the region extending along the first casing element 110 from the first end 112 and having a pivot axis 182 at a mid portion of the first casing element 110.

The cantilever 180 is arranged such that upon release of one of the fan blades 130, the cantilever 180 bends into the void 134 provided between the first and second casing elements 110, 120. The length of the cantilever 180 is arranged to be large enough to provide purchase for the fan blade 130 and/or to develop enough bending moment to cause collapse of the first casing element 110 at the cantilever pivot 182.

The distal (radially outer) surface 116 of the first casing element 110 may be provided with a linear array of rhomboid apertures 184 (see FIG. 5) which are formed across the width of the first casing element 110 at the cantilever pivot axis 182. In addition, the infill member 170 is severed at the pivot axis 182.

In other arrangements, the first casing element 110 may be provided with apertures 184 of an alternative shape. Alternatively, in preference to providing apertures 184 on the distal surface 116, the ply orientation of the structure of the distal surface 116 may be locally modified at the pivot axis 182.

Figure 6:
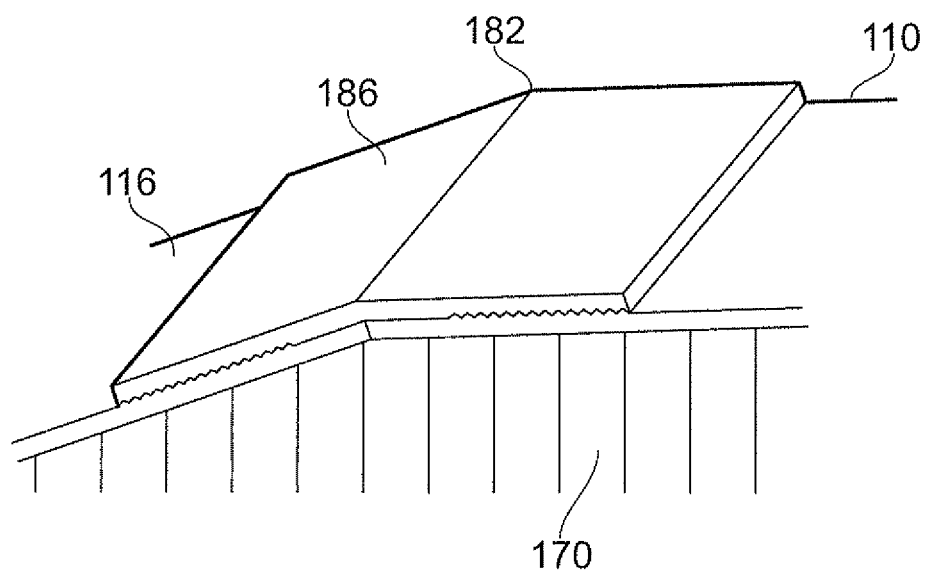
FIG. 6 shows a partial, perspective view of a fan track liner, not forming part of the present invention.

A further alternative arrangement, shown in FIG. 6, involves cutting through the distal surface 116 of the first casing element 110 at the cantilever pivot axis 182 and attaching a strong, flexible material, such as a Kevlar™ patch 186, across the pivot axis 182, to form a hinge.

Figure 7:
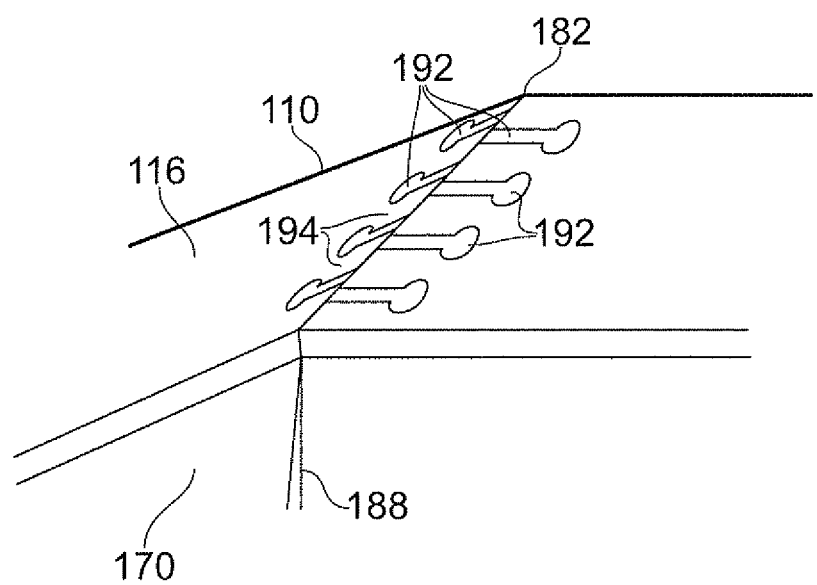
FIG. 7 shows a perspective view of a fan track liner, not forming part of the present invention.

A still further alternative, shown in FIG. 7, involves cutting through the distal surface 116 of the first casing element 110 and the infill member 170 at the cantilever pivot axis 182 to form a slit 188, and cutting the distal surface 116 to form a plurality of finger portions 192 which extend along the distal surface 116 of the first casing element 110, with a plurality of ligaments 194 therebetween. These finger portions 192 are attached to the distal surface 116 of the first casing element 110 with alternate finger portions 192 extending towards opposite ends of the first casing element 110.

When the forward section of casing element 116 is forced outwards, the slit 188 widens and the hinge point 182 is allowed to fracture the ligaments 194. This results in the separation of the first casing element 110 into two sections with the forward section being allowed to move forwards and radially outwards. The finger portions 192 serve to retain the two sections of the first casing element 110 together to prevent complete separation while allowing relative movement of the forward section.

In an alternative embodiment of the invention, the slit 188 may be filled with, for example, a non-setting filler or low tensile strength filler material. This would allow for the transmission of compressive loads across the slit 188 whilst allowing the slit 188 to open when the forward section of the first casing element 110 hinges about the hinge portion 182.

Figure 1:
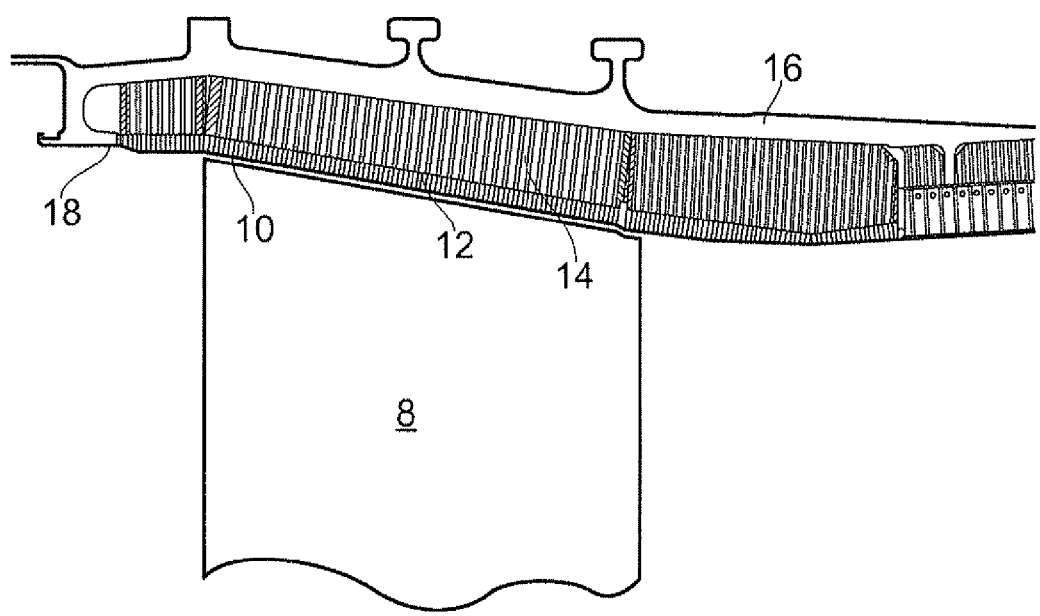
FIG. 1 shows a partial, sectional view of a conventional fan track liner as used in a gas turbine engine casing.

The second casing element 120 comprises a fan blade retaining feature 128 disposed at a forward, or first, end thereof, in the form of a hooked portion 128. The hooked portion 128 extends radially inwardly and then axially in a rearward direction, and corresponds to the hook 18 of FIG. 1.

In use, if a fan blade 130 becomes detached, it first strikes the proximal surface 114 of the forward portion of the first casing element 110. The energy associated with this impact event is then transferred to and absorbed by the energy absorbing element, for example by the compressive crushing of the crushable collar 140 and the infill member 170. This allows the forward portion of the first casing element 110 to deform radially outwards, exposing the hook 128. As the detached blade 130 continues to travel forwards and radially outwards, the blade tip engages with the hook 128 and subsequently becomes trapped in the casing assembly 100, thus preventing the blade 130 from travelling forward of the first end 122 of the second casing element 120.

Figure 8:
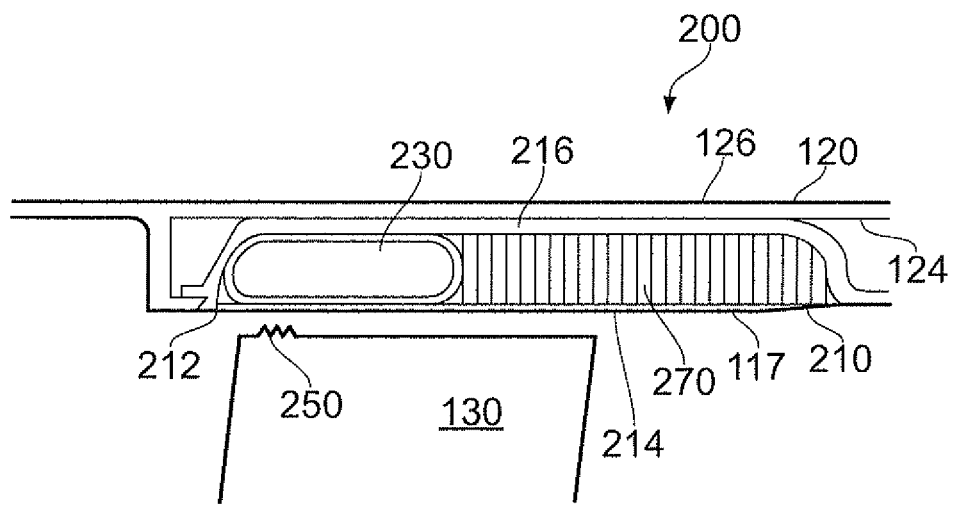
FIG. 8 shows a partial, sectional view of a fan casing assembly, not forming part of the present invention.
Figure 9:
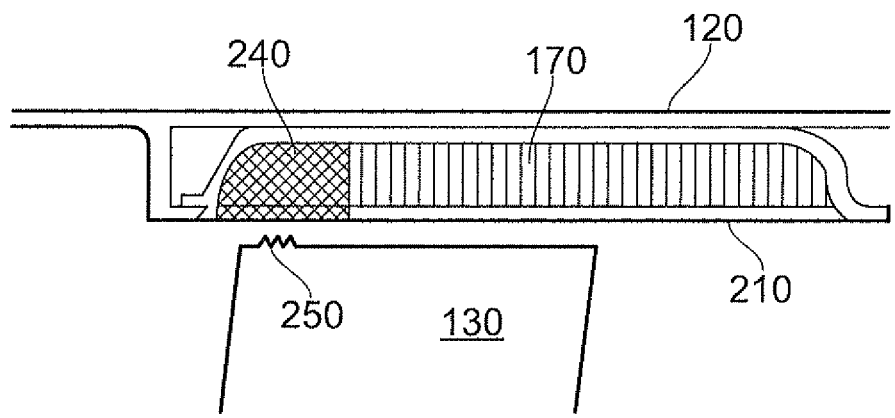
FIG. 9 shows a partial, sectional view of a fan casing assembly, not forming part of the present invention.

Referring to FIGS. 8 and 9, a fan casing assembly, not forming part of the present invention, is designated generally by the reference numeral 200. Features of the fan casing assembly 200 which correspond to those of fan casing assembly 100 have been given corresponding reference numerals for ease of reference.

The fan casing assembly 200 has a first casing element 210 and a second casing element 120.

In this embodiment, the first casing element 210 has a first end 212, a radially proximal surface 214 and a radially distal surface 216. The radially distal surface 216 of the first casing element 210 corresponds to the radially proximal surface 124 of the second casing element 120.

A rigid, hollow or fluid filled pocket 230 is disposed between the radially proximal and distal surfaces 214,216 at the first end 212 of the first casing element 210 and extends from the first end 212 towards a mid portion of the first casing element 210. An infill member 270 extends from the pocket 230 at the mid portion of the first casing element 210 to the rear end thereof.

While the embodiment described shows a single pocket 230, in other arrangements there may be two or more pockets.

The pocket 230 is filled with a pressurised gas. Alternatively, the pocket 230 may be filled with a liquid such as, for example, an epoxy resin. It may be advantageous for the epoxy resin to cure in response to UV radiation or to include a catalyst which cures in contact with air. In arrangements in which there is more than one pocket 230, a two part resin, or adhesive filler, may be utilised in which mixing of the components takes place after the fan blade 130 has penetrated the pockets 230.

Alternatively, the pocket 230 may be formed as a region of foam material 240, as shown in FIG. 9. In the arrangement of FIG. 9, the foam material may be provided on its radially innermost surface with an abradable skin.

Figure 10:
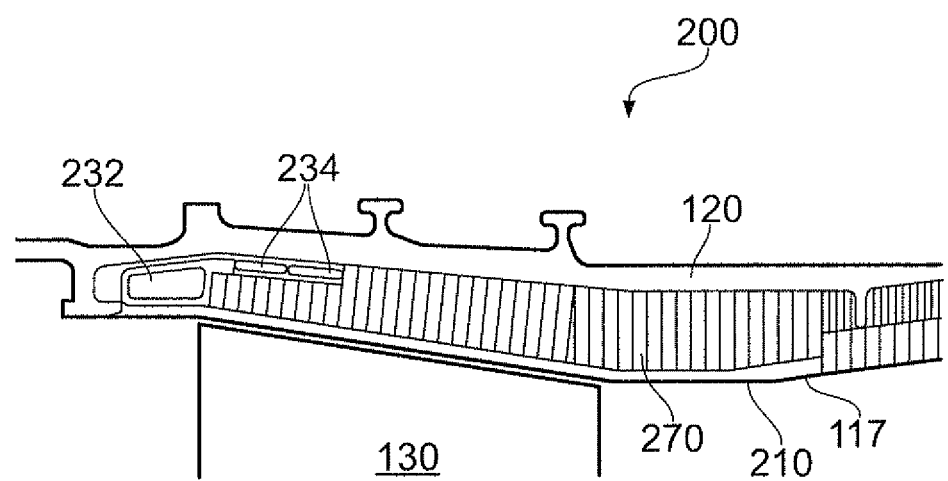
FIG. 10 shows a partial, sectional view of an alternative arrangement of the fan casing assembly of FIG. 8.

In an alternative arrangement, shown in FIG. 10, a primary pocket 232 is disposed at the first end 212 of the first casing element 210 and a plurality of secondary pockets 234 are disposed adjacent to the primary pocket 232 and extending behind a portion of the infill member 270 towards the rear of the first case element 210. The primary and secondary pockets 232,234 may or may not be in fluid communication with one another. This arrangement can provide a more progressive collapse mechanism to the impact by a fan blade 130.

The abradable layer 117 extends across both the infill member 270 and the fluid-filled pocket 230 on the proximal surface of the first casing element 210.

The pocket 230 itself is formed from a reinforced fabric material such as, for example, carbon fibre or glass fibre reinforced composite materials or a mixture thereof. Other materials, such as thermoplastics and aramid or metallic fibres or foils, may be used to form the pocket.

A cutting portion 250 is provided on a forward portion of the fan blade 130. This cutting portion 250 takes the form of a plurality of sharp projections. The position of the cutting portion 250 on the blade tip is arranged such that during a heavy tip rub condition, the cutting portion 250 does not contact the abradable layer 117.

In other arrangements, the cutting portion may comprise an abrasive coating applied to a portion of the blade tip.

Figure 11:
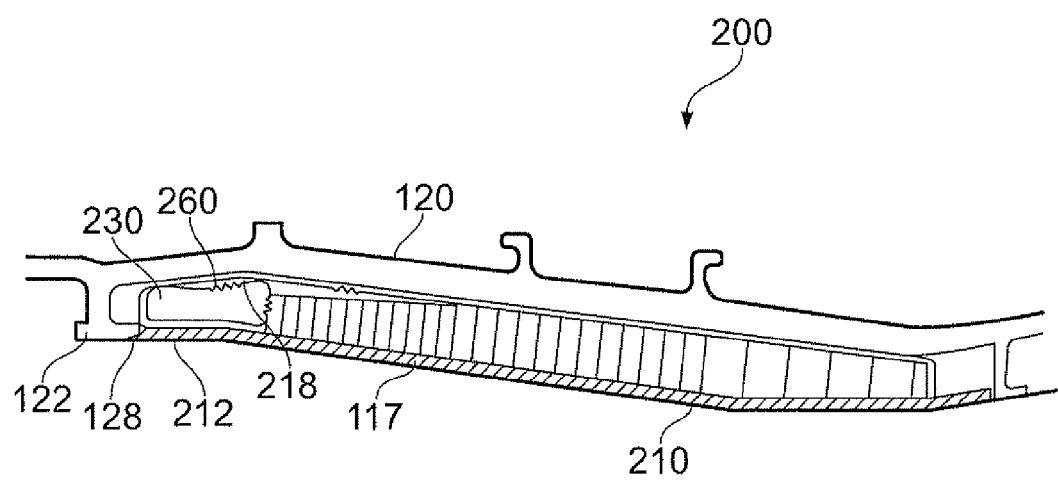
FIG. 11 shows a partial, sectional view of the fan casing assembly of FIG. 8 in which the pocket incorporates one or more cutting features.
Figure 12:
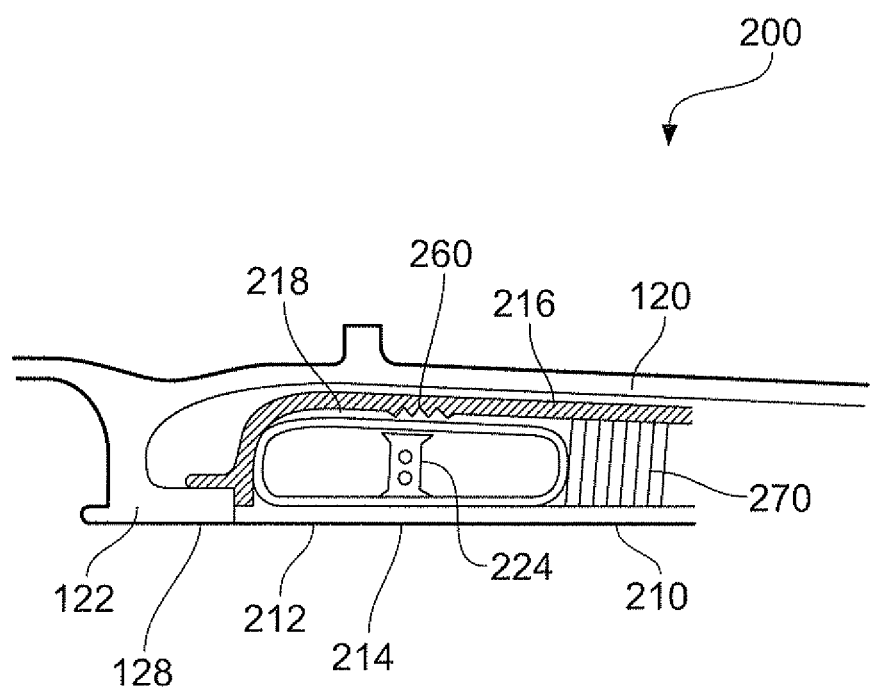
FIG. 12 shows a partial, sectional view of the fan casing assembly of FIG. 8 including a force transfer feature incorporating a cutting feature.

Alternatively, as shown in FIGS. 11 and 12, the cutting portion 260 may be disposed on an inner surface of the first casing element 210. In these arrangements, the cutting portion 250 is disposed on an inner surface 218 of the first casing element 210 and is in direct contact with the skin of the pocket 230. Consequently, impact energy applied to the abradable layer 117 is transferred to the cutting portion 260 where it may be applied to the pocket 230.

In the arrangement of FIG. 12, a force transfer feature 224 is provided within the pocket 230 which transfers a load applied to the proximal surface 214 of the first casing element 210 to the interface between the cutting portion 260 and the pocket. In this way, no modification to the fan blade 130 to include a cutting portion 250 is required. As shown in FIG. 12, the force transfer feature 224 may be configured (in this embodiment with holes/hollow sections) to allow deformation of the force transfer feature 224 so as not to overly impede the travel of the detached blade 130 on its course to be trapped by the hook 128 and the second casing element 120.

In use, when the blade 130 becomes detached, it penetrates the abradable layer 117 and the cutting portion 260 punctures the pocket 230. This allows the blade 130 to travel into the void defined by the pocket and exposes the hook 128 (see FIGS. 11 and 12) which engages with the blade 130 to trap it within the casing assembly 200.

Figure 13:
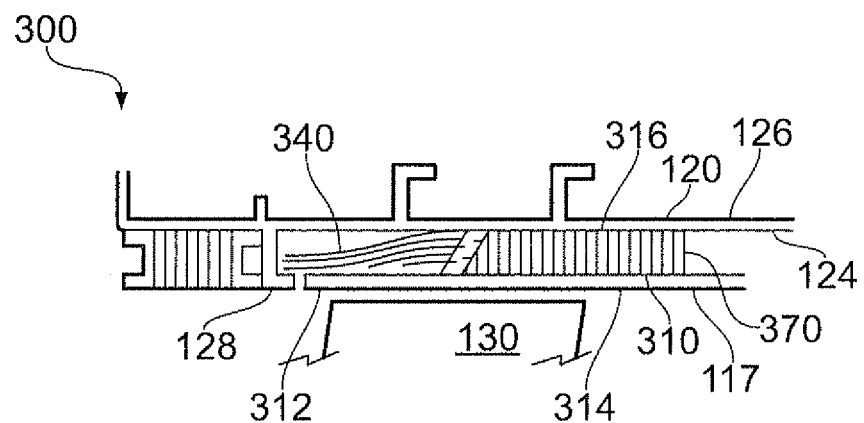
FIG. 13 shows a partial, sectional view of a fan casing assembly according to a first embodiment of the invention.
Figure 14A:
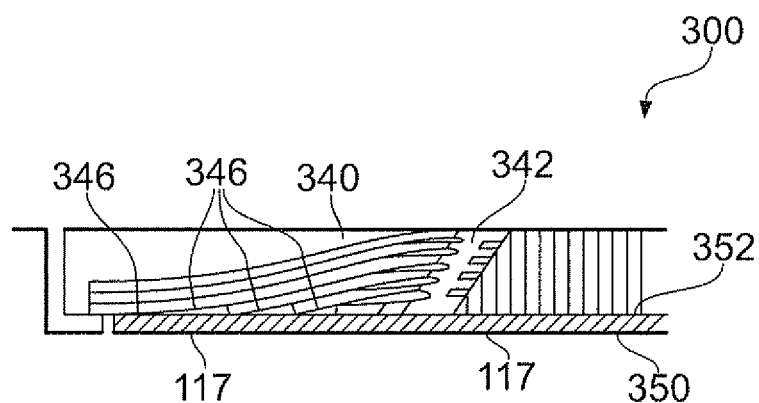
FIGS. 14a and 14b show partial, sectional views of the fan casing assembly of FIG. 13, before and after the impact of a fan blade.
Figure 14B:
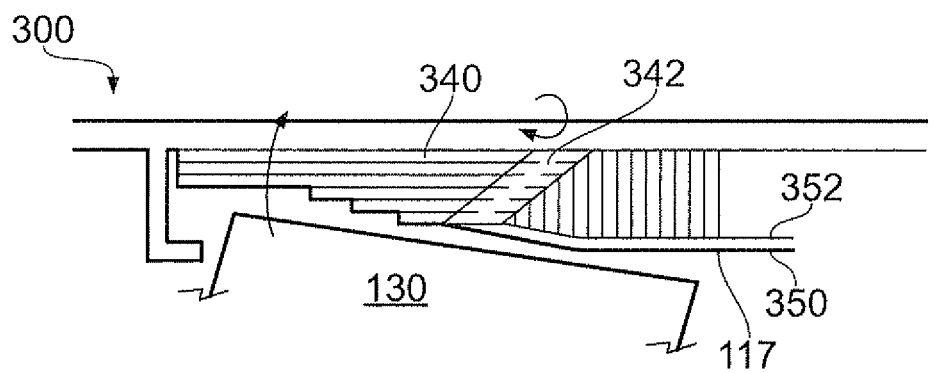

Referring to FIGS. 13 and 14, a fan casing assembly according to a first embodiment of the invention is designated generally by the reference numeral 300. Features of the fan casing assembly 300 which correspond to those of fan casing assembly 100 have been given corresponding reference numerals for ease of reference.

The fan casing assembly 300 has a first casing element 310 and a second casing element 120.

In this embodiment, the first casing element 310 has a first end 312, a radially proximal surface 314 and a radially distal surface 316. The radially distal surface 316 of the first casing element 310 abuts against the radially proximal surface 124 of the second casing element 120.

The first casing element 310 includes, on its radially proximal surface, an abradable layer 117 which is attached to an infill member 370. The abradable layer 117 has a proximal surface 350 and a distal surface 352.

The forward portion of the first casing element 310 comprises a plurality of resilient leaf elements 340 arranged in a stack and aligned with the axis of the fan casing assembly 300.

In this embodiment, the length of each leaf element 340 increases through the stack in a radially outward direction. Thus the shortest leaf element 340 is immediately adjacent to the abradable layer 117 and the longest is furthest from the abradable layer 117.

The leaf elements 340 are formed from a resilient material such as, for example a thermoplastic, carbon fibre or glass fibre laminate.

The leaf elements 340 are independent of one another and are mounted in a slotted elastomeric binder block 342 which is disposed laterally across the width of the first casing element 310. In this embodiment, the binder block 342 is formed from an elastomeric (rubber) material. In other embodiments, the binder block 342 may be formed from an alternative resilient material.

The binder block 342 abuts the forward edge of the infill member 370 and is angled rearwards. The leaf elements 340 are biased towards the proximal surface 314 of the first case element 310 and they may be through stitched 346 to maintain them in their biased position. In this way, the biased stack of leaf elements 340 abuts the distal face 352 of the abradable layer 117.

The forward ends of the plurality of resilient leaf elements 340 extend beyond the first end 312 of the first casing element 310 and are arranged to contact a distal surface of the hook 128.

In use, when a blade 130 becomes detached, it penetrates the abradable layer 117 and impacts the stack of resilient leaf elements 340. Some of the energy of the impact is dissipated in tearing the stitching 346 which holds the stack of leaf elements 340 together which results in the elements 346 deflecting and returning to their straight configuration. This in turn exposes the hook 128 which engages with the blade 130 to trap it within the casing assembly 300.

The casing assemblies disclosed herein are equally applicable to solid and hollow fan blades and may be used with light-weight (hollow line-core, or solid or hollow composite) fan blades. The casing assemblies may also be used with aerofoil structures, e.g. fan blades, comprising a principal load-carrying member at the front of the aerofoil structure such as a picture frame or metallic sheath. The present disclosure may also be applied to swept or unswept aerofoil structures.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims

What is claimed is:

1. A turbomachine casing assembly, comprising:
   a first casing element located radially outward of one or more rotating aerofoil elements of a turbomachine;
   a second casing element located radially outward of the first casing element; and
   a void, provided between the first casing element and the second casing element, at a first end of the first casing element; wherein
   the first end of the first casing element is located against a corresponding first end of the second casing element by a plurality of resilient leaf elements, the leaf elements being biased towards a radially proximal face of the first casing element,
   the first casing element comprises a cantilever, the cantilever being arranged in a region extending along the first casing element from the first end of the first casing element and having a pivot axis at a mid portion of the first casing element, and
   the first casing element comprises an infill element disposed between the radially proximal face and a distal face of the first casing element, and the plurality of leaf elements are each bonded to a first end of the infill element, whereby upon release of one of the rotating aerofoil elements, the cantilever bends into the void provided between the first and second casing elements, which causes the resilient leaf elements to deform and to thereby absorb at least some of the impact energy resulting from the released rotating aerofoil element.

2. The turbomachine casing assembly as claimed in claim 1, wherein each resilient leaf element is formed from a material selected from the group comprising thermoplastic, carbon fibre and glass fibre materials and composites thereof.

3. The turbomachine casing assembly as claimed in claim 1, wherein an end of each of the plurality of leaf elements is bonded to a binder block, the binder block being attached to the first end of the infill element.

4. The turbomachine casing element as claimed in claim 1, wherein each of the plurality of leaf elements is attached to one another.

5. The turbomachine casing assembly as claimed in claim 4, wherein each of the plurality of leaf elements is attached to one another by through stitching.

6. The turbomachine casing assembly as claimed in claim 1, wherein the radially proximal face of the first casing element is contiguous with a radially proximal face of the second casing element to form an uninterrupted surface.

7. The gas turbine engine fan casing comprising the turbomachine casing assembly as claimed in claim 1.

8. The gas turbine comprising a turbomachine casing assembly as claimed in claim 1.

* * * * *